(12) United States Patent
Fujieda (10) Patent No.: US 9,698,606 B2
(45) Date of Patent: *Jul. 4, 2017

(54) WIRELESS POWER TRANSMISSION ANTENNA APPARATUS

(75) Inventor: Tomoyuki Fujieda, Fujisawa (JP)

(73) Assignee: PIONEER CORPORATION, Kanagawa (JP)

(*) Notice: Subject to any disclaimer, the term of this patent is extended or adjusted under 35 U.S.C. 154(b) by 226 days.

This patent is subject to a terminal disclaimer.

(21) Appl. No.: 14/412,570

(22) PCT Filed: Jul. 4, 2012

(86) PCT No.: PCT/JP2012/067126
§ 371 (c)(1),
(2), (4) Date: Jan. 26, 2015

(87) PCT Pub. No.: WO2014/006712
PCT Pub. Date: Jan. 9, 2014

(65) Prior Publication Data
US 2015/0137613 A1    May 21, 2015

(51) Int. Cl.
*H02J 5/00* (2016.01)
*H01Q 1/36* (2006.01)
(Continued)

(52) U.S. Cl.
CPC ............. *H02J 5/005* (2013.01); *H01F 38/14* (2013.01); *H01Q 1/36* (2013.01); *H01Q 1/526* (2013.01); *H01Q 7/00* (2013.01); *H01Q 1/2208* (2013.01)

(58) Field of Classification Search
None
See application file for complete search history.

(56) References Cited

U.S. PATENT DOCUMENTS

2009/0243785 A1* 10/2009 Deicke ............... H01Q 7/00
336/221
2010/0065352 A1* 3/2010 Ichikawa ............. B60L 11/182
180/65.8
(Continued)

FOREIGN PATENT DOCUMENTS

EP    1 814 191    8/2007
JP    04-317527    11/1992
(Continued)

OTHER PUBLICATIONS

International Search Report, PCT/JP2012/067126, Jul. 31, 2012.
Japanese Official Action—2014-523490—Aug. 30, 2016.

*Primary Examiner* — Jared Fureman
*Assistant Examiner* — Aqeel Bukhari
(74) *Attorney, Agent, or Firm* — Young & Thompson (57) ABSTRACT

A wireless power transmission antenna apparatus (100, 200) is mounted on a wireless power transmitting apparatus configured to transmit electric power in a wireless manner, and is provided with: an antenna coil (10) obtained by winding a conductive member; a plurality of plate-like members (21, 22, 23, 24), each containing metal and disposed in surroundings of the antenna coil and in a radial direction of the antenna coil; and a housing case (30) containing metal and configured to accommodate therein the antenna coil and the plurality of plate-like members. The plate-like member is disposed such that a plate face thereof crosses a direction of extension of the conductive member. According to the wireless power transmission antenna apparatus, it is possible to improve power transmission efficiency while complying with radio wave protection guidelines.

12 Claims, 11 Drawing Sheets

(51) Int. Cl.
*H01Q 1/52* (2006.01)
*H01Q 7/00* (2006.01)
*H01F 38/14* (2006.01)
*H01Q 1/22* (2006.01)

(56) References Cited

U.S. PATENT DOCUMENTS

2016/0142110 A1* 5/2016 Park .................... H02J 7/00
455/573
2016/0226310 A1* 8/2016 Muratov ................ H01F 38/14

FOREIGN PATENT DOCUMENTS

| | | |
|---|---|---|
| JP | 2000-099658 | 4/2000 |
| JP | 2007-325054 | 12/2007 |
| JP | 2011-091999 | 5/2011 |
| JP | 2013-80785 | 5/2013 |

* cited by examiner

(a) Magnetic field energy (b) Electric field energy

FIG. 3

(a) Magnetic field energy (comparative example)

(b) Electric field energy (comparative example)

(a) Magnetic field energy (b) Electric field energy

FIG. 8

(a) Magnetic field energy (comparative example)

(b) Electric field energy (comparative example)

(a) Magnetic field energy (b) Electric field energy

(a) Magnetic field energy (b) Electric field energy

(a) Magnetic field energy (b) Electric field energy

WIRELESS POWER TRANSMISSION ANTENNA APPARATUS

TECHNICAL FIELD

The present invention relates to a wireless power transmission antenna apparatus used for a power transmitting apparatus configured to transmit electric power in a wireless manner, for example, by magnetic resonance or the like.

BACKGROUND ART

As this type of apparatus, for example, there is proposed an apparatus provided with a shield box made of an electromagnetic shielding material in order to shield a leakage electromagnetic field (refer to Patent Literature 1).

CITATION LIST

Patent Literature

Patent Literature 1: Japanese Patent Application Laid Open No. 2011-91999

SUMMARY OF INVENTION

Technical Problem

By the way, if the power transmission is performed in the wireless manner by using the magnetic resonance, power transmission efficiency is improved by increasing magnetic field energy.

On the other hand, since the wireless power transmission causes a leakage magnetic field, radio wave protection guidelines such as, for example, guidelines of international commission on non-ionizing radiation protection (ICNIRP) are provided. It is therefore necessary to design the structure of the antenna apparatus to satisfy the radio wave protection guidelines.

The aforementioned background art has such a technical problem that it is hard to simultaneously satisfy both improvement of the power transmission efficiency and compliance with the radio wave protection guidelines.

It is therefore an object of the present invention to provide a wireless power transmission antenna apparatus which can improve the power transmission efficiency while complying with the radio wave protection guidelines.

Solution to Problem

The above object of the present invention can be achieved by a wireless power transmission antenna apparatus mounted on a wireless power transmitting apparatus configured to transmit electric power in a wireless manner, said wireless power transmission antenna apparatus is provided with: an antenna coil obtained by winding a conductive member; a plurality of plate-like members, each containing metal and disposed in surroundings of the antenna coil and in a radial direction of the antenna coil; and a housing case containing metal and configured to accommodate therein the antenna coil and the plurality of plate-like members, wherein a plate face of each of the plurality of plate-like member crosses a direction of extension of the conductive member.

The operation and other advantages of the present invention will become more apparent from embodiments and examples explained below.

DESCRIPTION OF EMBODIMENTS

The wireless power transmission antenna apparatus in the embodiment is a wireless power transmission antenna apparatus mounted on a wireless power transmitting apparatus configured to transmit electric power in a wireless manner, said wireless power transmission antenna apparatus is provided with: an antenna coil obtained by winding a conductive member; a plurality of plate-like members, each containing metal and disposed in surroundings of the antenna coil and in a radial direction of the antenna coil; and a housing case containing metal and configured to accommodate therein the antenna coil and the plurality of plate-like members, wherein a plate face of each of the plurality of plate-like member crosses a direction of extension of the conductive member.

The wireless power transmission antenna apparatus in the embodiment is mounted on the wireless power transmitting apparatus configured to transmit electric power in the wireless manner, for example, by magnetic resonance, as a power transmission antenna apparatus or a power reception antenna apparatus. Various known aspects can be applied to a configuration of the wireless power transmitting apparatus other than the antenna.

The wireless power transmission antenna apparatus is provided with the antenna coil and the plate-like member. The antenna coil is obtained by winding the conductive member. The conductive member is wound to form, for example, a spiral, helical, figure-eight shaped, or annular current path. The antenna coil can be in various shapes such as, for example, circular, rectangular, and polygonal.

Each of the plurality of plate-like members contains metal. Each of the plurality of plate-like members is disposed not to be in contact with the antenna coil in the surroundings of the antenna coil, and in the radial direction of the antenna coil. In addition, the plate face of each of the plurality of plate-like members is disposed to cross the direction of the extension of the conductive member.

The "direction of the extension of the conductive member" means a direction in which the conductive member extends in a portion in which a line along the plate-like member crosses the antenna coil, as planarly viewed from above the antenna coil. If the portion in which the line along the plate-like member crosses the antenna coil has a curvature, the "direction of the extension of the conductive member" means a tangential direction of the portion in which the line along the plate-like member crosses the antenna coil. The plate face of the plate-like member is not limited to a plane surface but may be a curved surface.

The housing case contains metal. The housing case accommodates therein the antenna coil and the plurality of plate-like members.

If electric power is supplied to the antenna coil (i.e. in operation of the wireless power transmission antenna apparatus), an electric field and a magnetic field are generated in the surroundings of the antenna coil. By the way, in the embodiment, the plurality of plate-like members each containing metal are disposed such that each of the plate faces crosses the direction of the extension of the conductive member which constitutes the antenna coil. In other words, the plate face of the plate-like member is disposed along (and desirably parallel to) a magnetic field surface (H surface) of the magnetic field generated in the surroundings of the antenna coil. Thus, the electric field generated in the surroundings of the antenna coil is perpendicular to the plate-face of the plate-like member. As a result, an electric field component is suppressed due to a shielding effect by the plate-like member (i.e. energy conversion to the electric field is suppressed). On the other hand, the magnetic field generated in the surroundings of the antenna coil is hardly influenced by the plurality of plate-like members.

As a result of the suppression of the energy conversion to the electric field by the plurality of plate-like members, energy conversion to the magnetic field is accelerated. Then, even if the electric power supplied to the wireless power transmission antenna apparatus is equal to electric power supplied to an antenna apparatus without the plate-like member, the wireless power transmission antenna apparatus can generate higher magnetic field energy than the antenna apparatus without the plate-like member does. It is thus possible to improve the power transmission efficiency if the power transmission is performed in the wireless manner by the magnetic resonance.

In addition, the housing case containing metal accommodates therein the antenna coil, and it is thus possible to suppress the electric field and the magnetic field that leaks to the surroundings of the antenna coil. As a result, it is possible to comply with the radio wave protection guidelines, relatively easily.

Too many plate-like members suppress the magnetic field generated in the surroundings of the antenna coil. Therefore, the number of the plate-like members is to be appropriately designed, for example, by using an electromagnetic simulator or the like.

EXAMPLES

Examples of the wireless power transmission antenna apparatus of the present invention will be explained with reference to the drawings.

First Example

A first example of the wireless power transmission antenna apparatus of the present invention will be explained with reference to FIG. 1 to FIG. 9.

(Configuration of Antenna Apparatus)

Figure 1:
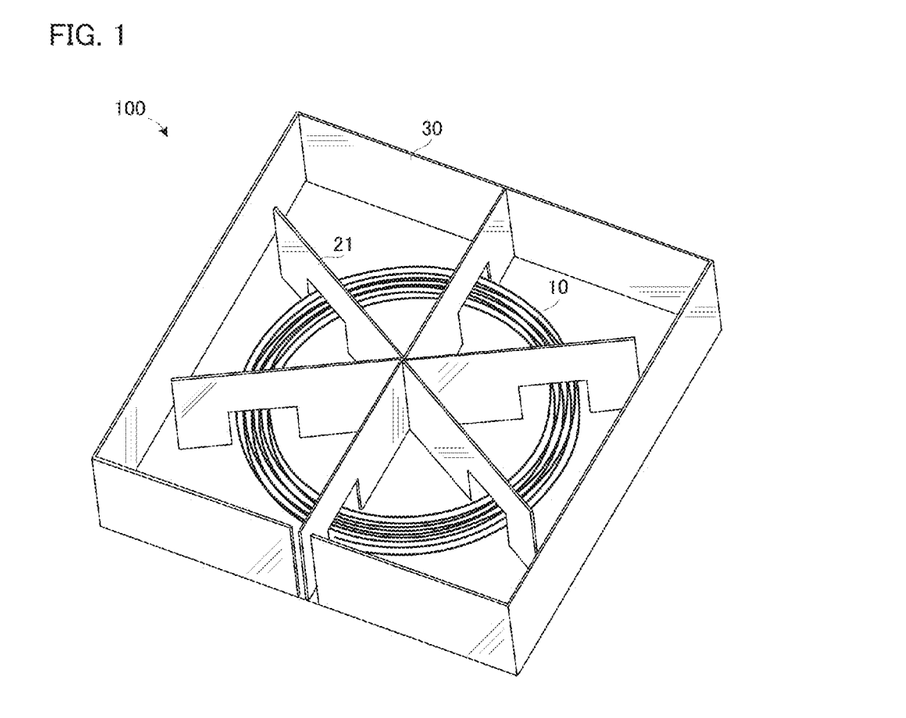
FIG. 1 is a schematic block diagram illustrating an overview of an antenna apparatus in a first example.

Firstly, a configuration of the antenna apparatus in the first example will be explained with reference to FIG. 1. FIG. 1 is a schematic block diagram illustrating an overview of the antenna apparatus in the first example.

In FIG. 1, an antenna apparatus 100 is provided with an antenna coil 10, a plurality of mode filters 21, and a shield case 30. The antenna coil 10, such as, for example, a dipole antenna and a helical antenna, is formed by winding a conductive member. The "mode filter" means a member having a filtering function which suppresses an unnecessary electric field component to enhance magnetic field coupling.

The mode filter 21 as one example of the "plate-like member" of the present invention is disposed in a radial direction of the antenna coil 10 so as not to be in contact with the antenna coil 10 as illustrated in FIG. 1. In particular, a plate face of the mode filter 21 is disposed to cross a direction of extension of the conductive member which constitutes the antenna coil 10. The mode filter 21 is ideally disposed perpendicular to an electric field surface associated with an electric field generated in the surroundings of the antenna coil 10, and parallel to a magnetic field surface associated with a magnetic field generated in the surroundings of the antenna coil 10.

Moreover, each of the plurality of mode filters 21 is in contact with at least other adjacent mode filters 21 in an air core of the antenna coil 10. The mode filters 21 and side surfaces of the shield case 30 may be or may not be in contact with each other.

Due to the arrangement of the mode filters 21 as described above, impedance to the electric field increases in comparison with a case where there is no mode filter 21, while impedance to the magnetic field is hardly influenced. This can result in the suppression of the electric field generated in the surroundings of the antenna coil 10, and the enhancement of the magnetic field generated in the surroundings of the antenna coil 10.

The mode filter 21 may be made only of a metal plate, or may be made of a metal plate with coatings and resins applied on a surface thereof for the purpose of, for example, rust prevention or the like. The antenna apparatus 100 illustrated in FIG. 1 is provided with six mode filters 21; however, at least one mode filter 21 allows the effect of the present invention to be obtained.

The shield case 30 as one example of the "housing case" of the present invention is formed of an electromagnetic shielding material such as metal. The shield case 30 accommodates therein the antenna coil 10 and the mode filters 21, as illustrated in FIG. 1.

Now, one example of the size of the antenna apparatus 100 will be exemplified hereinafter.

The antenna coil 10 has a wire pitch of 7 millimeters (mm), a thickness (i.e. coil length) of 18 mm, and an outer diameter of 300 mm. The turn number of the antenna coil 10 is 4.2 turns because resonance frequency is set around 13 megahertz (MHz). The shield case 30 has a size of length 400 mm by width 400 mm by height 100 mm. A slit for taking out a feed cable, provided on one side surface of the shield case 30, has a width of 20 mm. There is a distance of 17 mm between a bottom surface of the antenna coil 10 and a bottom surface of the shield case 30. The mode filter 21 has a thickness of 2 mm.

(Effect of Mode Filter)

Figure 2:
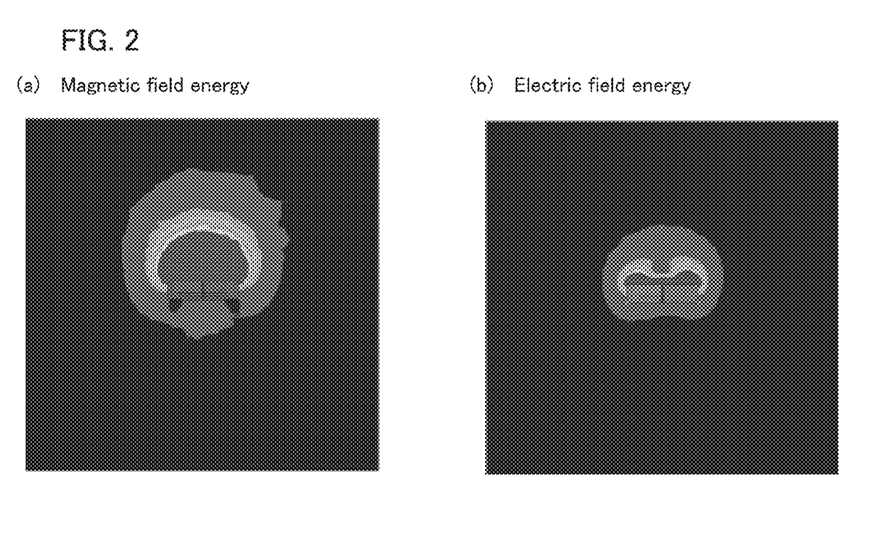
FIG. 2 are diagrams illustrating one example of respective simulation results of magnetic field energy and electric field energy in the surroundings of the antenna apparatus in the first example FIG. 3 are diagrams illustrating one example of respective simulation results of the magnetic field energy and the electric field energy in the surroundings of an antenna apparatus in a comparative example.
Figure 3:
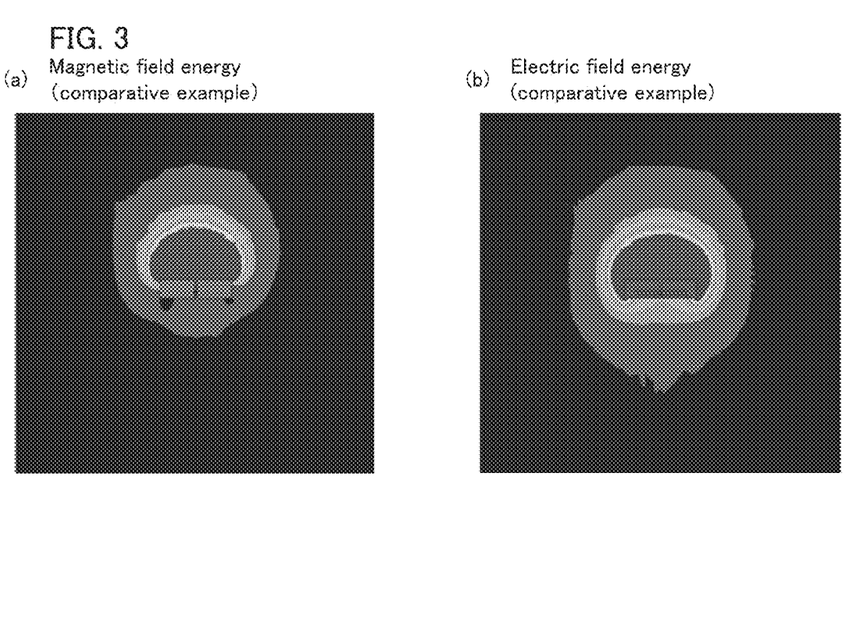

Next, an effect of the mode filter 21 in operation of the antenna apparatus 100 as configured above will be explained with reference to FIG. 2 and FIG. 3. FIG. 2 illustrate one example of respective simulation results of magnetic field energy and electric field energy in the surroundings of the antenna apparatus in the first example. FIG. 3 illustrate one example of respective simulation results of the magnetic field energy and the electric field energy in the surroundings of an antenna apparatus in a comparative example.

In the example, in order to verify the effect of the mode filter 21 of the antenna apparatus 100, each of the magnetic field energy and the electric field energy is obtained by simulations if an electric power of 50 watts (W) is supplied to the antenna apparatus 100.

As illustrated in FIG. 2, it is clear that the antenna apparatus 100 in the example (i.e. with the mode filter 21) has a significantly narrow distribution of the electric field energy (refer to FIG. 2(b)) in comparison with a distribution of the magnetic field energy (refer to FIG. 2(a)).

On the other hand, as illustrated in FIG. 3, it is clear that the antenna apparatus in the comparative example has a wider distribution of the electric field energy (refer to FIG. 3(b)) than a distribution of the magnetic field energy (refer to FIG. 3(a)).

Comparing FIG. 2(b) and FIG. 3(b), it is found that the mode filter 21 suppresses the distribution of the electric field energy. In other words, it is considered that the mode filter 21 suppresses the energy conversion to the electric field. On the other hand, comparing FIG. 2(a) and FIG. 3(a), it is found that the mode filter 21 hardly influences or does not influence at all the distribution of the magnetic field energy.

(Power Transmission Efficiency)

Figure 4:
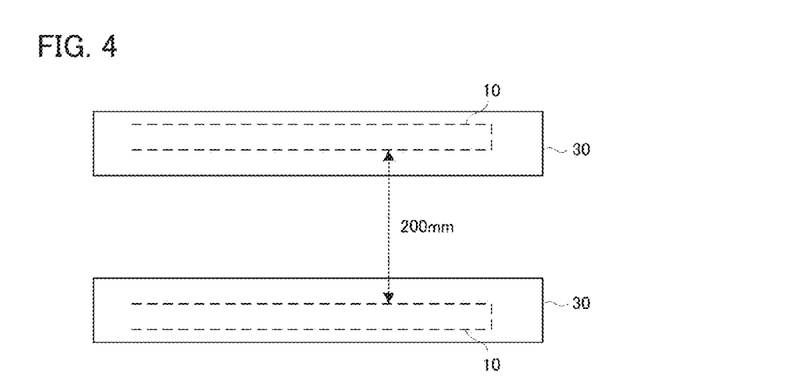
FIG. 4 is a conceptual diagram illustrating one example of arrangement of antenna apparatuses when wireless power transmission is performed.
Figure 5:
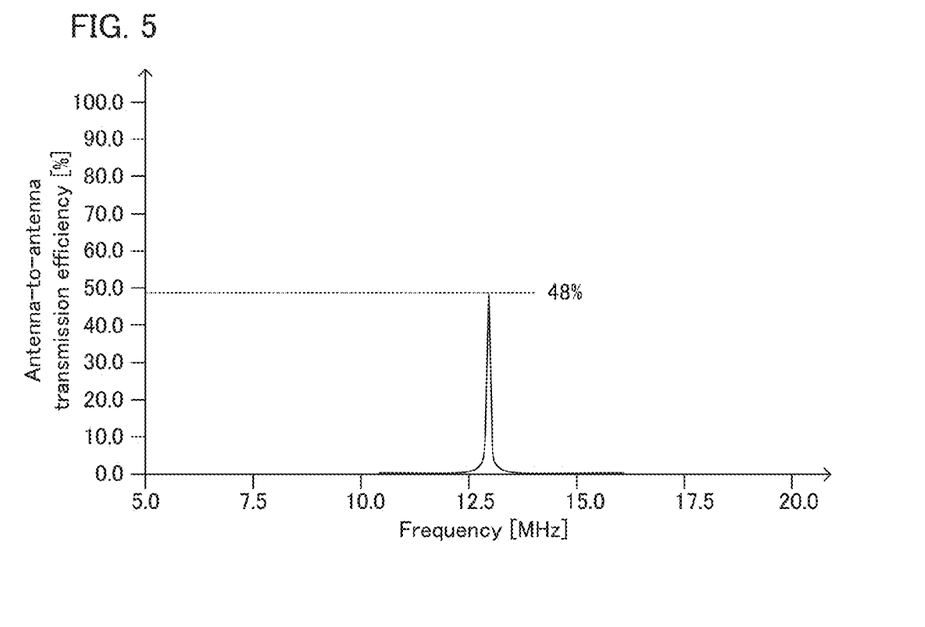
FIG. 5 are diagrams illustrating one example of power transmission efficiency when the power transmission is performed by using the antenna apparatuses in the first example.
Figure 6:
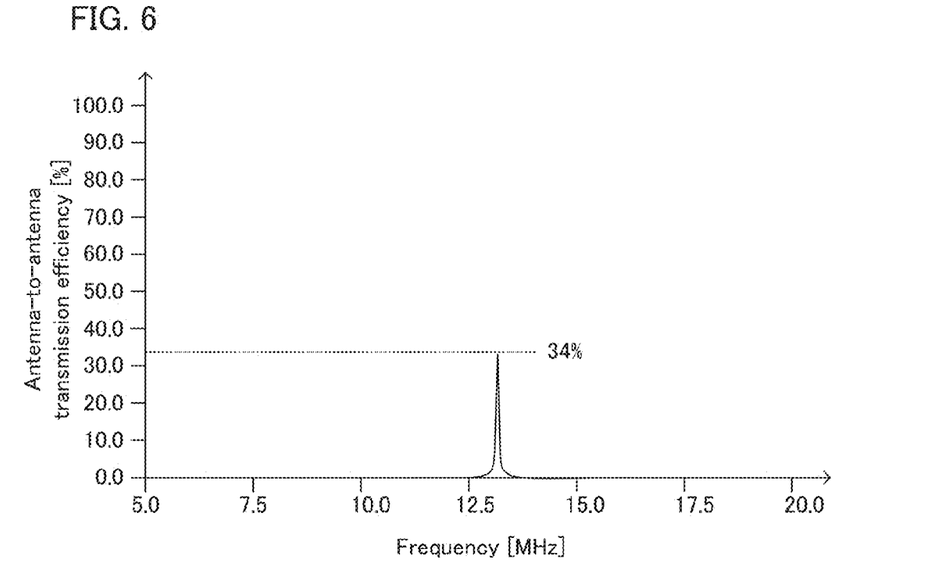
FIG. 6 are diagrams illustrating one example of power transmission efficiency when the power transmission is performed by using the antenna apparatuses in the comparative example.

Next, power transmission efficiency when the wireless power transmission is performed by the magnetic resonance by using two antenna apparatuses 100 will be explained with reference to FIG. 4 to FIG. 6. FIG. 4 is a conceptual diagram illustrating one example of arrangement of the antenna apparatuses when the wireless power transmission is performed. FIG. 5 is a characteristic diagram illustrating one example of the power transmission efficiency when the wireless power transmission is performed by using the antenna apparatuses in the first example. FIG. 6 is a characteristic diagram illustrating one example of the power transmission efficiency when the wireless power transmission is performed by using the antenna apparatuses in the comparative example.

As illustrated in FIG. 4, it is assumed that there is a distance of 200 mm between an upper surface of an antenna coil 10 (or an antenna coil 10 on a lower side of FIG. 4) of a power transmission side antenna apparatus 100 and an upper surface of an antenna coil 10 (or an antenna coil 10 on an upper side of FIG. 4) of a power reception side antenna apparatus 100 during the power transmission.

As illustrated in FIG. 5, the antenna apparatuses 100 in the example (i.e. with the mode filter 21) have a power transmission efficiency of at most 48%. On the other hand, as illustrated in FIG. 6, the antenna apparatuses in the comparative example (i.e. without the mode lifter) have a power transmission efficiency of at most 34%.

This is because the antenna apparatuses in the example obtain higher magnetic field energy than the antenna apparatuses in the comparison example do, due to the suppression of the energy conversion to the electric field by the mode filter 21. In other words, the mode filter 21 can improve the power transmission efficiency.

(Leakage Electromagnetic Field)

Figure 7:
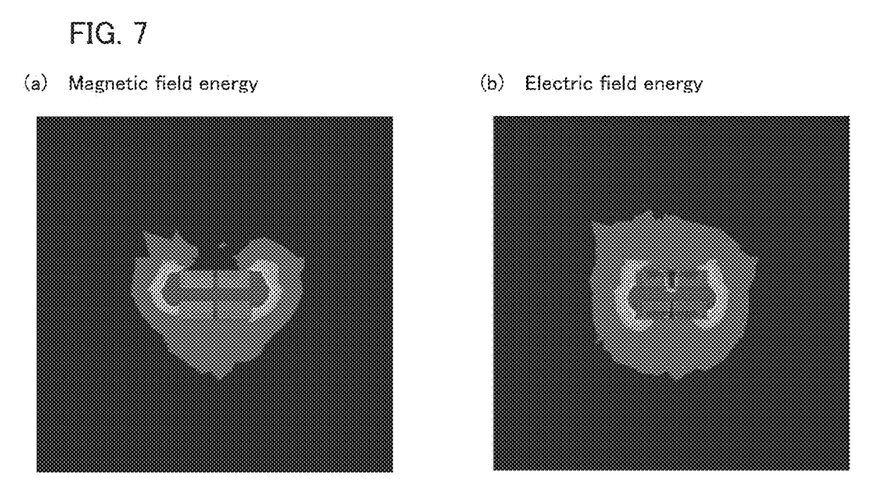
FIG. 7 is a diagram illustrating one example of respective simulation results of the magnetic field energy and the electric field energy in the surroundings when the wireless power transmission is performed by using the antenna apparatuses in the first example.
Figure 8:
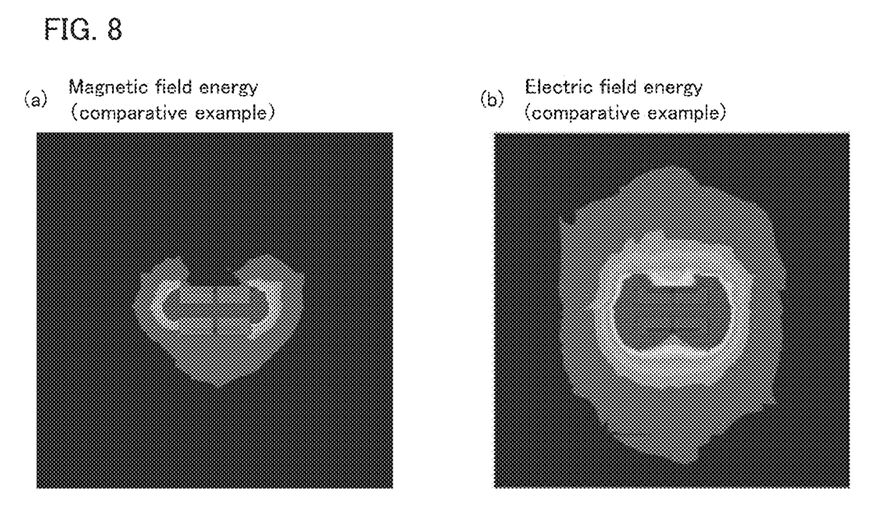
FIG. 8 is a diagram illustrating one example of respective simulation results of the magnetic field energy and the electric field energy in the surroundings when the wireless power transmission is performed by using the antenna apparatuses in the comparative example.

Next, a leakage electromagnetic field when the wireless power transmission is performed by the magnetic resonance will be explained with reference to FIG. 7 to FIG. 9. FIG. 7 illustrate one example of respective simulation results of the magnetic field energy and the electric field energy in the surroundings when the power transmission is performed by using the antenna apparatuses in the first example. FIG. 8 illustrate one example of respective simulation results of the magnetic field energy and the electric field energy in the surroundings when the power transmission is performed by using the antenna apparatuses in the comparative example.

With refer to FIG. 7(a) and FIG. 8(a), it is clear that there is almost no difference between a distribution of the magnetic field energy during the wireless power transmission using the antenna apparatuses 100 in the example (i.e. with the mode filter 21) and a distribution of the magnetic field energy during the wireless power transmission using the antenna apparatuses in the comparative example (i.e. without the mode filter).

On the other hand, with refer to FIG. 7(b) and FIG. 8(b), it is clear that the distribution of the electric field energy during the wireless power transmission using the antenna apparatuses 100 in the example (i.e. with the mode filter 21) is significantly narrower than the distribution of the magnetic field energy during the wireless power transmission using the antenna apparatuses in the comparative example (i.e. without the mode filter). In other words, it is found that the mode filter 21 significantly reduces the leakage electric field.

Next, a range in which each of the magnetic field energy and the electric field energy is less than or equal to a default value determined by radio wave protection guidelines will be explained with reference to FIG. 9. FIG. 9 illustrate one example of respective simulation results of the distribution of the magnetic field energy and the distribution of the electric field energy, for each of the antenna apparatuses in the first example and the antenna apparatuses in the comparative example. In FIG. 9, "radio wave protection guidelines" is a value determined in Japan, and "ICNIRP" is a value determined by the guidelines of ICNIRP.

Figure 9:
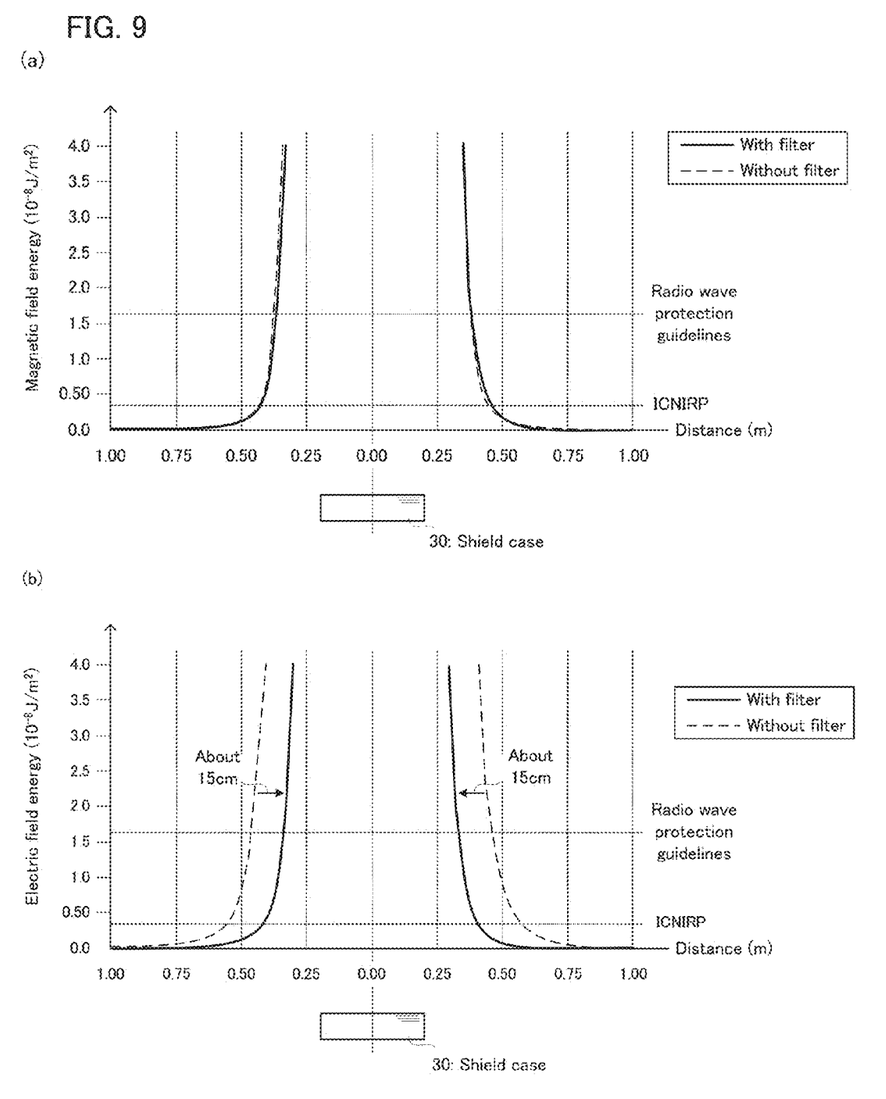
FIG. 9 are diagrams illustrating one example of respective simulation results of a distribution of the magnetic field energy and a distribution of the electric field energy, for each of the antenna apparatus in the first example and the antenna apparatus in the comparative example.

As illustrated in FIG. 9(a), regarding the magnetic field energy, both the antenna apparatus 100 in the example ("with filter" in FIG. 9) and the antenna apparatus in the comparative example ("without filter" in FIG. 9) have a similar distance from the shield case at which the magnetic field energy is less than or equal to, for example, the value determined by the guidelines of ICNIRP.

On the other hand, as illustrated in FIG. 9(b), regarding the electric field energy, by the effect of the mode filter 21, a distance from the shield case at which the electric field energy is less than or equal to, for example, the value determined by the guidelines of ICNIRP is reduced by about 15 cm in comparison with the case where there is no mode filter.

As described above, the antenna apparatus 100 in the example provided with the mode filters 21 can comply with the radio wave protection guidelines, relatively easily.

Moreover, the presence of the mode filter 21 improves a withstand load of the antenna apparatus 100, which is extremely useful in practice. The antenna coil 10 is not limited to be circular as illustrated in FIG. 1, but may be in various shapes such as, for example, rectangular and polygonal.

Second Example

Figure 10:
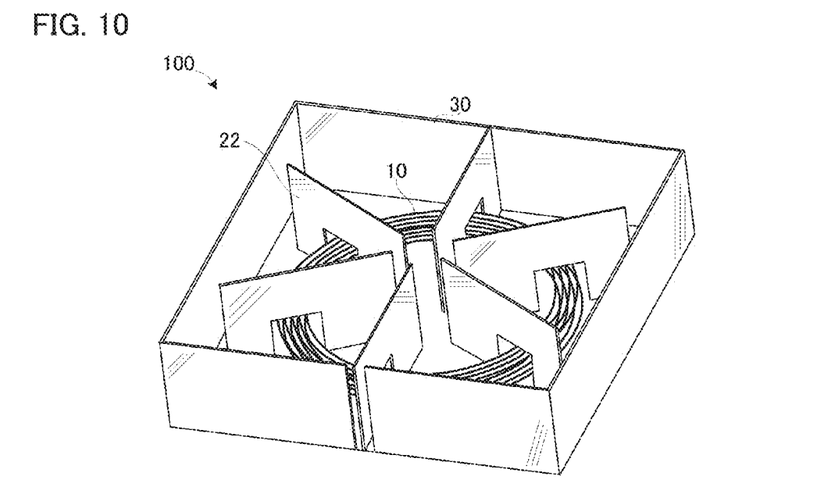
FIG. 10 is a schematic block diagram illustrating an overview of an antenna apparatus in a second example.
Figure 11:
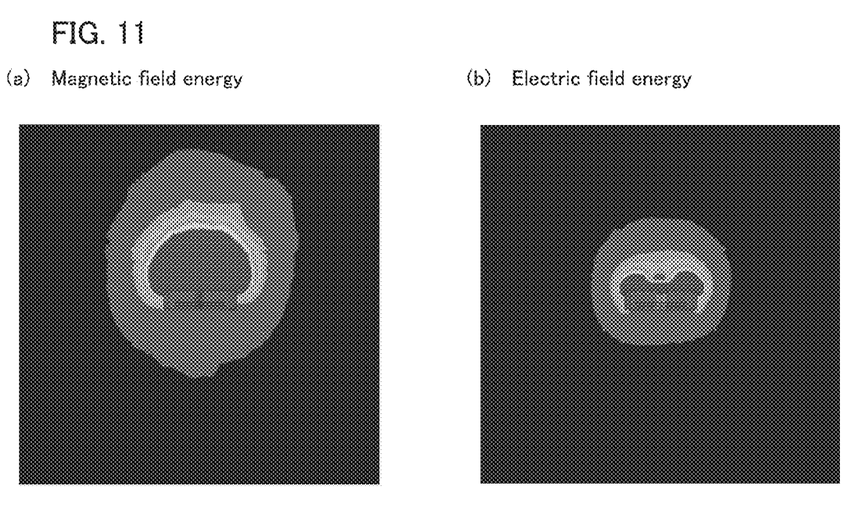
FIG. 11 are diagrams illustrating one example of respective simulation results of the magnetic field energy and the electric field energy in the surroundings of the antenna apparatus in the second example.

A second example of the wireless power transmission antenna apparatus of the present invention will be explained with reference to FIG. 10 and FIG. 11. A repetitive explanation of the first example described above will be omitted as occasion demands, and the same parts will carry the same reference numerals. FIG. 10 is a schematic block diagram illustrating an overview of the antenna apparatus in the second example, to the same effect as in FIG. 1. FIG. 11 illustrate one example of respective simulation results of the magnetic field energy and the electric field energy in the surroundings of the antenna apparatus in the second example, to the same effect as in FIG. 2.

In FIG. 10, the antenna apparatus 100 in the example is provided with the antenna coil 10, a plurality of mode filters 22, and the shield case 30. Here, in particular, the plurality of mode filters 22 are not in contact with each other. As illustrated in FIG. 11, even in the example, it is clear that the electric field energy is suppressed by the effect of the mode filter 22.

Figure 12:
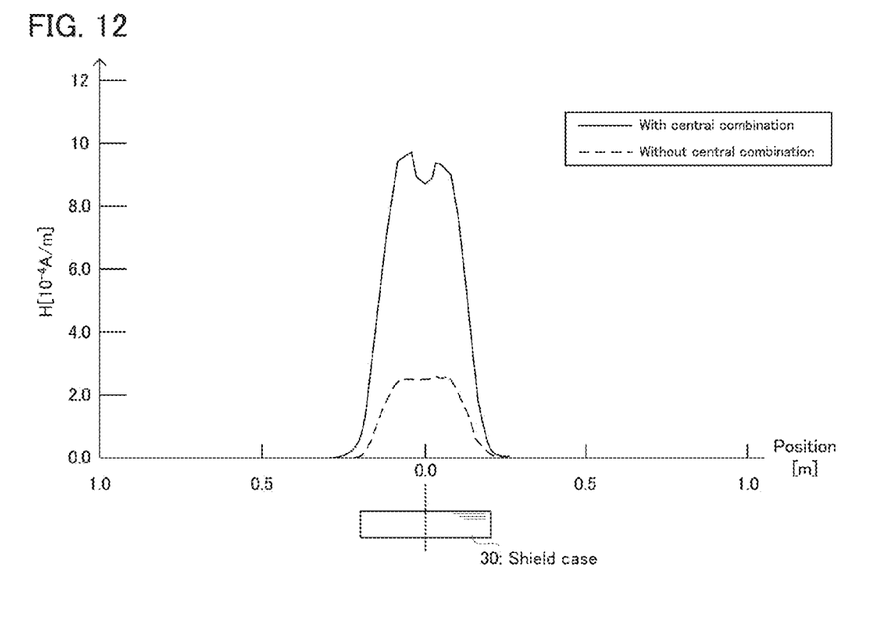
FIG. 12 is a diagram illustrating one example of simulation results of the distribution of the magnetic field energy, for each of the antenna apparatus in the first example and the antenna apparatus in the second example.
Figure 13:
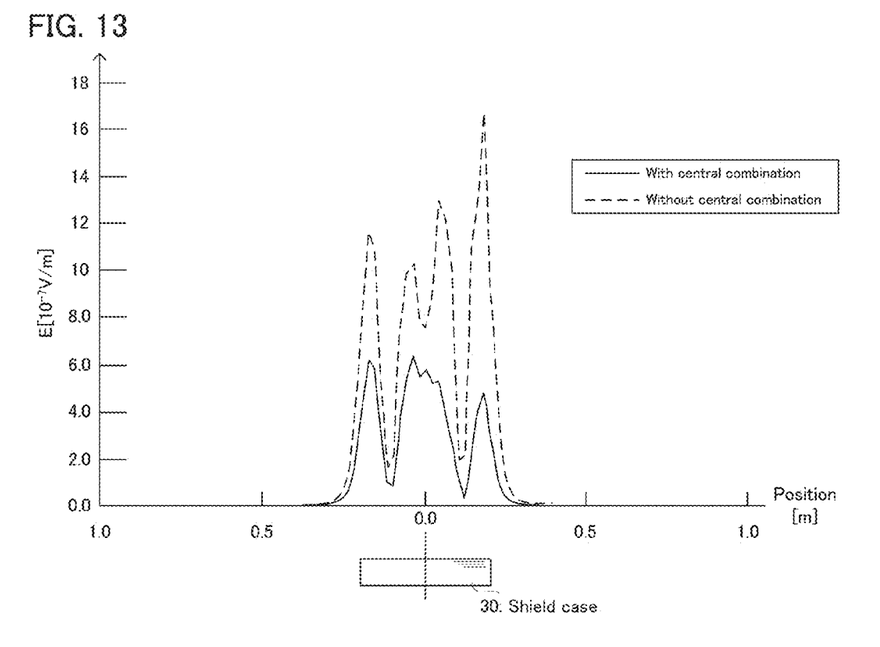
FIG. 13 is a diagram illustrating one example of simulation results of the distribution of the electric field energy, for each of the antenna apparatus in the first example and the antenna apparatus in the second example.
Figure 14:
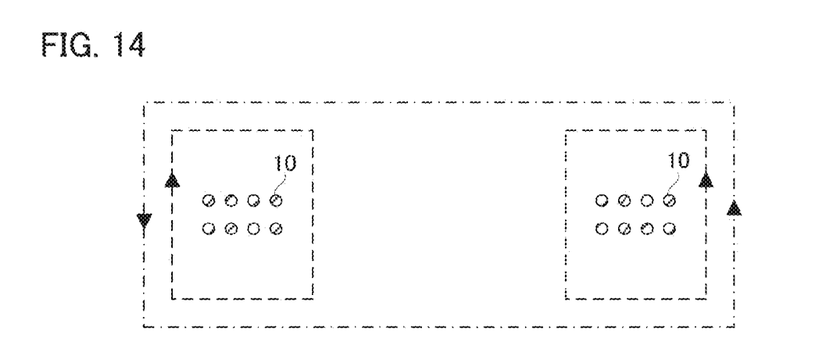
FIG. 14 is a conceptual diagram illustrating a concept of a magnetic field generated in the surroundings of an antenna coil.

Next, a difference between the antenna apparatus 100 in the second example and the antenna apparatus 100 in the first example will be explained with reference to FIG. 12 to FIG. 14. FIG. 12 illustrates one example of simulation results of the distribution of the magnetic field energy, for each of the antenna apparatus in the first example and the antenna apparatus in the second example. FIG. 13 illustrates one example of simulation results of the distribution of the electric field energy, for each of the antenna apparatus in the first example and the antenna apparatus in the second example. FIG. 14 is a conceptual diagram illustrating a concept of a magnetic field generated in the surroundings of the antenna coil.

As illustrated in FIG. 12, it is clear that the antenna apparatus 100 in the first example ("with central combination" in FIG. 12) has about five times higher magnetic field strength than the antenna apparatus 100 in the second example ("without central combination" in FIG. 12), Moreover, as illustrated in FIG. 13, it is clear that the antenna apparatus 100 in the first example ("with central combination" in FIG. 12) has about half to one third of electric field strength of the antenna apparatus 100 in the second example ("without central combination" in FIG. 12).

This is considered to be because the generation of the magnetic field illustrated by an alternate long and short dash line in FIG. 14 is suppressed by bringing the mode filters 21 into contact with (or connecting) each other in the air core of the antenna coil 10 (refer to FIG. 1), as in the antenna apparatus 100 in the first example. It is suppressed that magnetic fields illustrated by a dashed line in FIG. 14 are weakened by the magnetic field illustrated by the alternate long and short dash line, which results in the enhancement of the magnetic field strength.

Third Example

Figure 15:
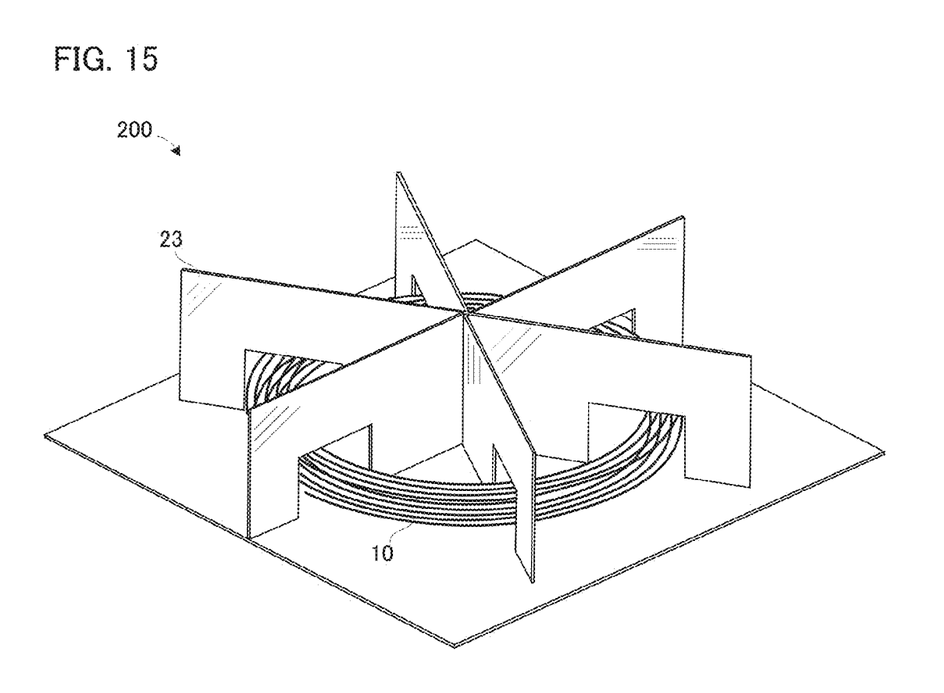
FIG. 15 is a schematic block diagram illustrating an overview of an antenna apparatus in a third example.
Figure 16:
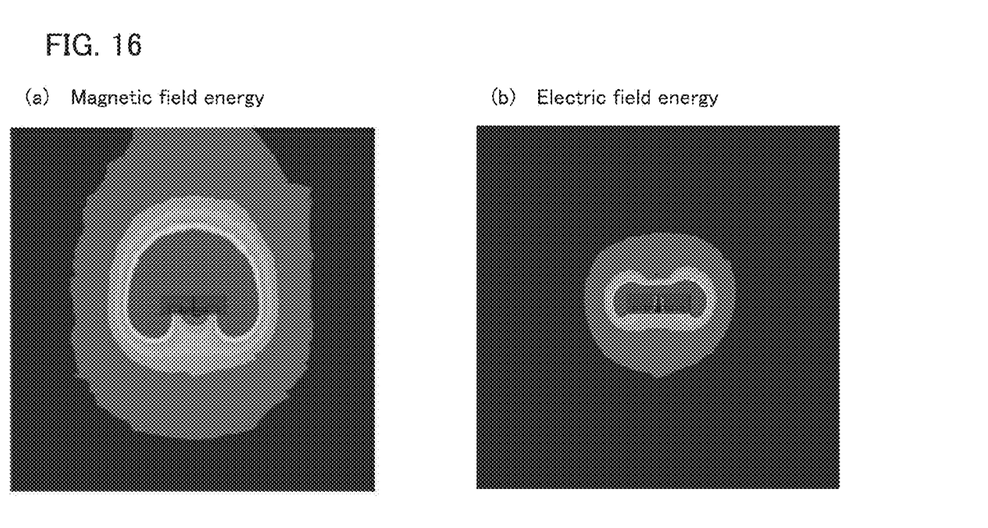
FIG. 16 are diagrams illustrating one example of respective simulation results of the magnetic field energy and the electric field energy in the surroundings of the antenna apparatus in the third example.

A third example of the wireless power transmission antenna apparatus of the present invention will be explained with reference to FIG. 10 and FIG. 16. A repetitive explanation of the first example described above will be omitted as occasion demands, and the same parts will carry the same reference numerals. FIG. 15 is a schematic block diagram illustrating an overview of the antenna apparatus in the third example, to the same effect as in FIG. 1. FIG. 16 illustrate one example of respective simulation results of the magnetic field energy and the electric field energy in the surroundings of the antenna apparatus in the third example, to the same effect as in FIG. 2.

In FIG. 15, the antenna apparatus 200 in the third example is provided with the antenna coil 10 and a plurality of mode filters 23. Here, in particular, each of the plurality of mode filters 23 is in contact with at least other adjacent mode filters 23 in the air core of the antenna coil 10. As illustrated in FIG. 16, even in the example, it is clear that the electric field energy is suppressed by the effect of the mode filter 23.

Fourth Example

Figure 17:
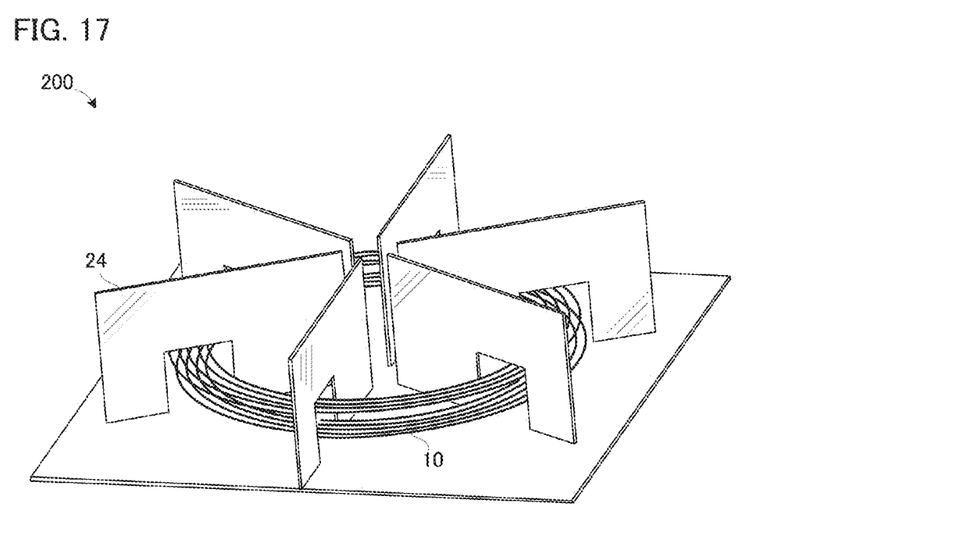
FIG. 17 is a schematic block diagram illustrating an overview of an antenna apparatus in a fourth example.
Figure 18:
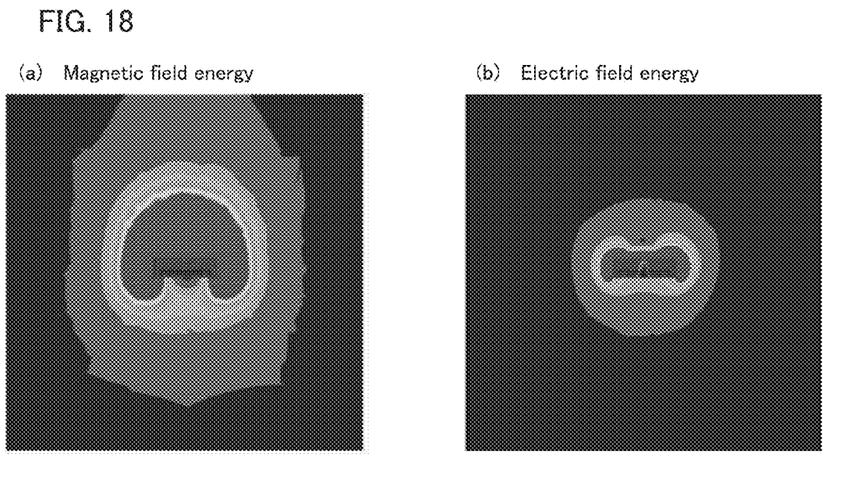
FIG. 18 are diagrams illustrating one example of respective simulation results of the magnetic field energy and the electric field energy in the surroundings of the antenna apparatus in the fourth example FIG. 19 are diagrams illustrating other examples of the shape of a mode filter in the examples.

A fourth example of the wireless power transmission antenna apparatus of the present invention will be explained with reference to FIG. 17 and FIG. 18. A repetitive explanation of the first example described above will be omitted as occasion demands, and the same parts will carry the same reference numerals. FIG. 17 is a schematic block diagram illustrating an overview of the antenna apparatus in the fourth example, to the same effect in FIG. 1. FIG. 18 illustrate one example of respective simulation results of the magnetic field energy and the electric field energy in the surroundings of the antenna apparatus in the fourth example, to the same effect in FIG. 2.

In FIG. 17, the antenna apparatus 200 in the fourth example is provided with the antenna coil 10 and a plurality of mode filters 24. Here, in particular, the plurality of mode filters 24 are not in contact with each other. As illustrated in FIG. 18, even in the example, it is clear that the electric field energy is suppressed by the effect of the mode filter 24.

As explained in the first example to the fourth example, by using the mode filter, it is possible to suppress the electric field generated in the surroundings of the antenna coil 10 to improve the power transmission efficiency, and it is also possible to comply with the radio wave protection guidelines, relatively easily.

Figure 19:
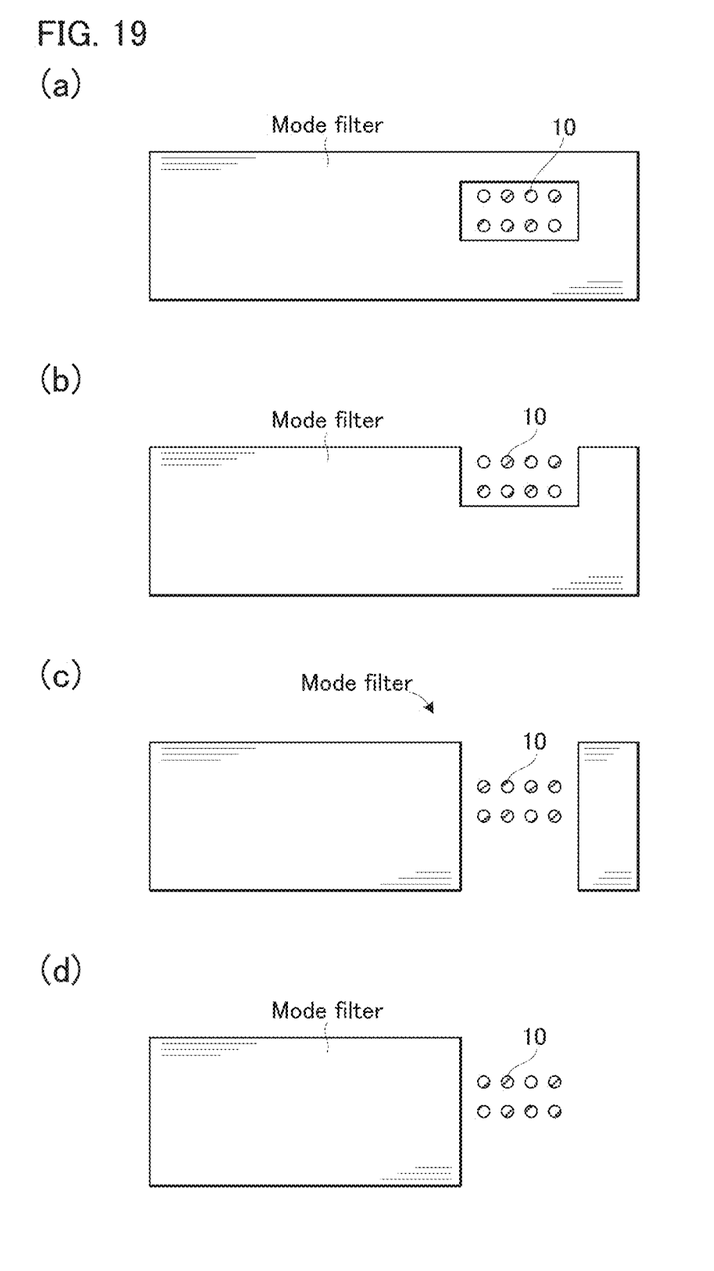

The shape of the mode filter is not limited to the shape illustrated in FIG. 1 and the like, but may be in various shapes, for example, as illustrated in FIG. 19. FIG. 19 are diagrams illustrating other examples of the shape of the mode filter in the examples.

The present invention is not limited to the aforementioned embodiment and example, but various changes may be made, if desired, without departing from the essence or spirit of the invention which can be read from the claims and the entire specification. A wireless power transmission antenna apparatus which involves such changes is also intended to be within the technical scope of the present invention.

DESCRIPTION OF REFERENCE NUMERALS

10 antenna coil
21, 22, 23, 24 mode filter
30 shield case
100, 200 antenna apparatus

The invention claimed is:

1. A wireless power transmission antenna apparatus comprising:
   an antenna coil obtained by winding a conductive member;
   a plurality of plate-like members, each containing metal and disposed in surroundings of the antenna coil and in a radial direction of the antenna coil; and
   a housing case containing metal and configured to accommodate therein the antenna coil and the plurality of plate-like members,
   wherein
   a plate face of each of the plurality of plate-like member crosses a direction of extension of the conductive member, and
   each of the plurality of plate-like members extends radially from an air core of the antenna coil.

2. The wireless power transmission antenna apparatus according to claim 1, wherein each of the plurality of plate-like members directly contacts adjacent ones of the plurality of plate-like members in the air core of the antenna coil.

3. The wireless power transmission antenna apparatus according to claim 1, wherein each of the plurality of plate-like members is arranged to suppress an electric field generated in the surroundings of the antenna coil in operation of said wireless power transmission antenna apparatus.

4. The wireless power transmission antenna apparatus according to claim 1, comprising six of the plurality of plate-like members extending radially from the air core of the antenna coil.

5. The wireless power transmission antenna apparatus according to claim 1, wherein each of the plurality of plate-like members extending radially from the air core of the antenna coil has a cut-out portion through which the antenna coil extends without touching the respective one of the plurality of plate-like members.

6. The wireless power transmission antenna apparatus according to claim 1, wherein each of the plurality of plate-like members does not directly contact adjacent ones of the plurality of plate-like members.

7. A wireless power transmission antenna apparatus comprising:
   an antenna coil obtained by winding a conductive member;
   a plurality of plate-like members, each containing metal and disposed to extend from a part of an air core of the antenna coil to a direction of the conductive member; and
   a housing case containing metal and configured to accommodate therein the antenna coil and the plurality of plate-like members, wherein
   an extension face of a plate face of each of the plurality of plate-like member crosses a direction of extension of the conductive member, and
   each of the plurality of plate-like members extends radially from an air core of the antenna coil.

8. The wireless power transmission antenna apparatus according to claim 7, wherein each of the plurality of plate-like members directly contacts adjacent ones of the plurality of plate-like members in the air core of the antenna coil.

9. The wireless power transmission antenna apparatus according to claim 7, wherein each of the plurality of plate-like members is arranged to suppress an electric field generated in the surroundings of the antenna coil in operation of said wireless power transmission antenna apparatus.

10. The wireless power transmission antenna apparatus according to claim 7, comprising six of the plurality of plate-like members extending radially from the air core of the antenna coil.

11. The wireless power transmission antenna apparatus according to claim 7, wherein each of the plurality of plate-like members extending radially from the air core of the antenna coil has a cut-out portion through which the antenna coil extends without touching the respective one of the plurality of plate-like members.

12. The wireless power transmission antenna apparatus according to claim 7, wherein each of the plurality of plate-like members does not directly contact adjacent ones of the plurality of plate-like members.

* * * * *